Dec. 2, 1958 L. DE MATTIA 2,862,241
APPARATUS FOR THE AUTOMATIC CONTROLLED FEEDING
OF PLASTIC MATERIAL
Filed Nov. 30, 1956 2 Sheets-Sheet 1
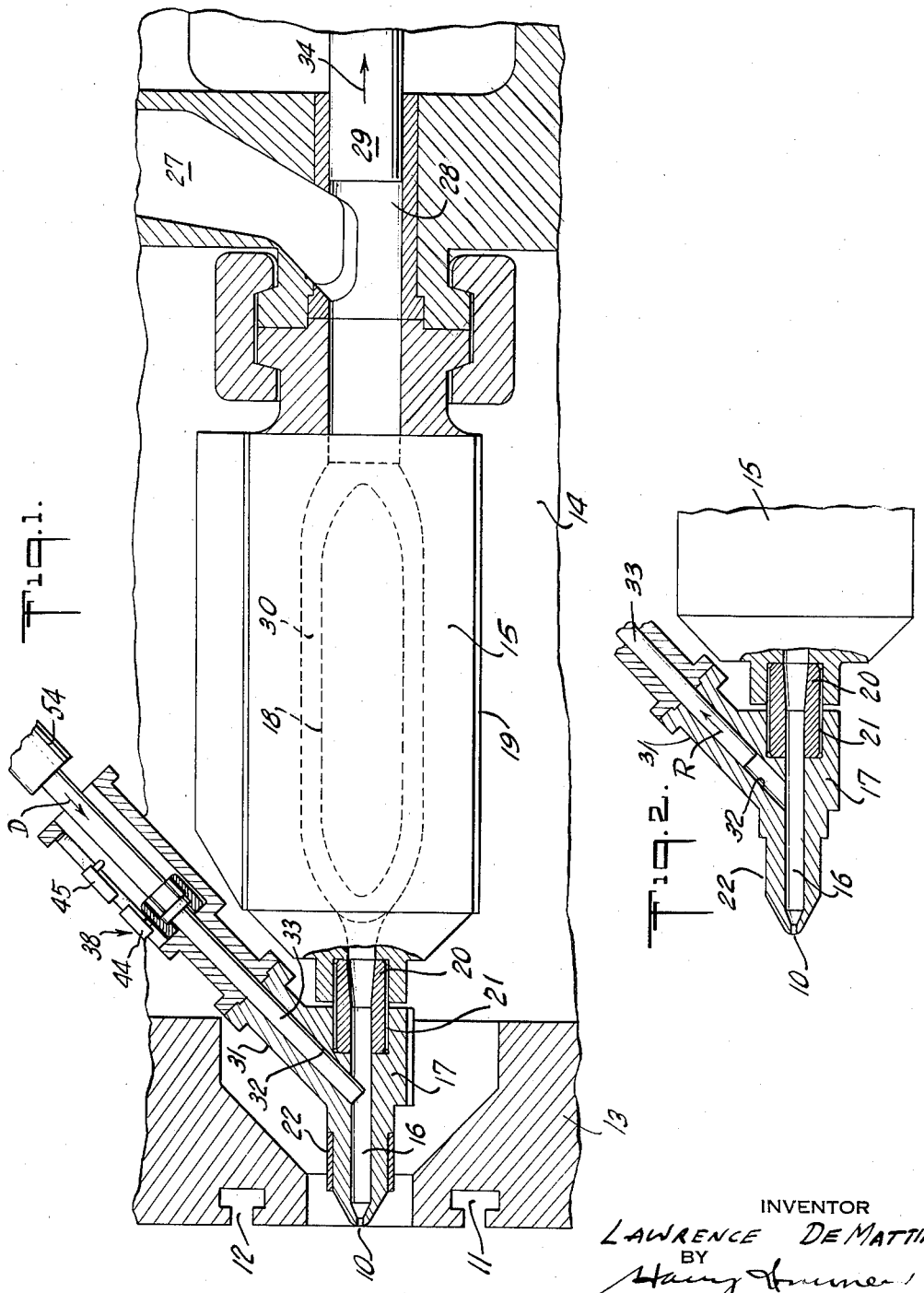
INVENTOR
LAWRENCE DE MATTIA
BY
ATTORNEY

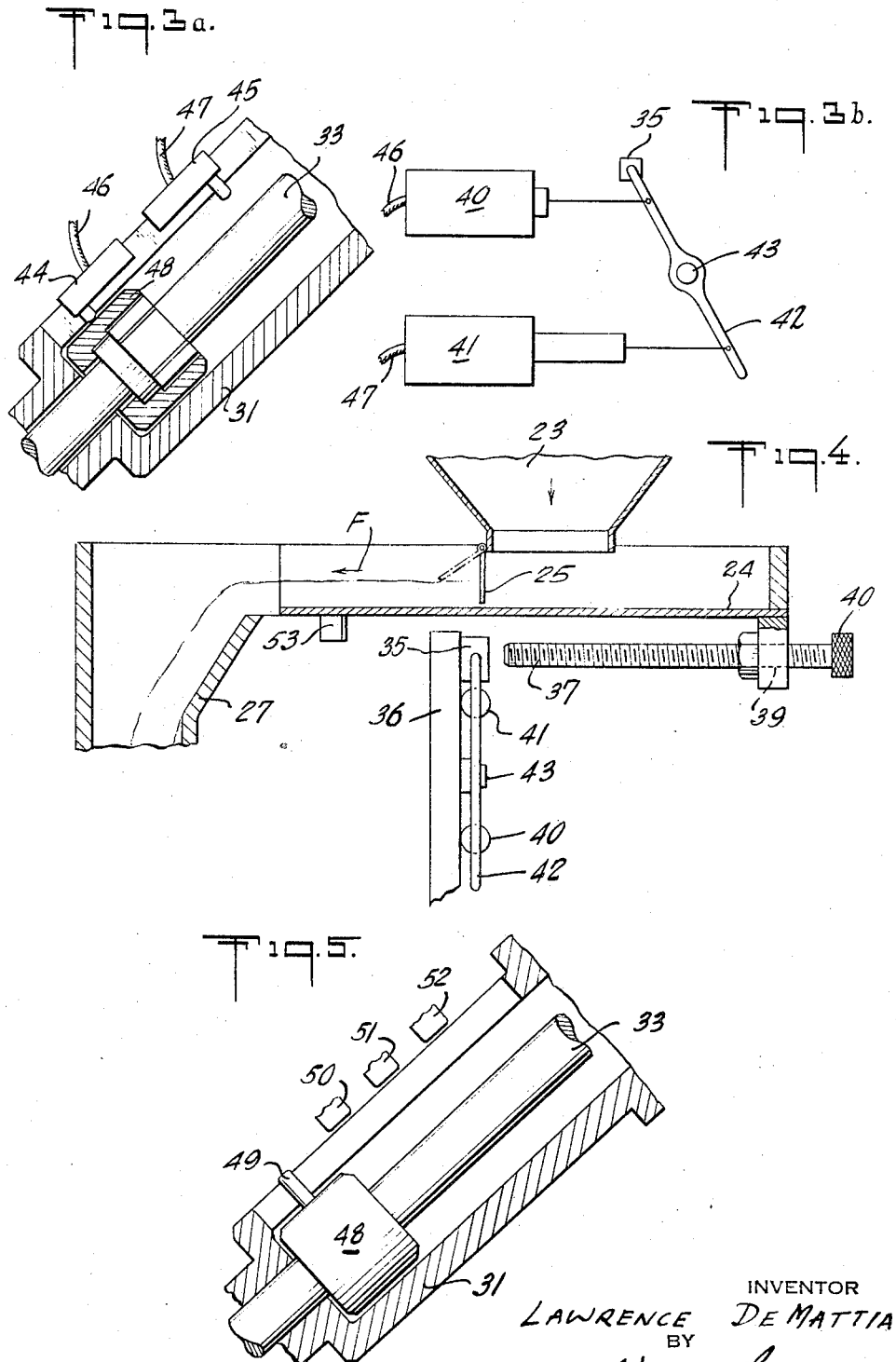

United States Patent Office 2,862,241
Patented Dec. 2, 1958

2,862,241

APPARATUS FOR THE AUTOMATIC CONTROLLED FEEDING OF PLASTIC MATERIAL

Lawrence De Mattia, Cedar Grove, N. J., assignor to De Mattia Machine & Tool Co., Clifton, N. J., a corporation of New Jersey Application November 30, 1956, Serial No. 625,505

3 Claims. (Cl. 18—30)

This invention is a device for the automatic controlled feeding of plastic materials into molding machines. If less than the required amount of material is fed into the molds, articles will not be properly formed in such machines. If excess material is fed into such molds, such excess forms "flash" or "fins" which must be removed and which represent in production, a very considerable waste of material. Many expedients were heretofore proposed in the plastics art in an effort to attain precise feeding of material mainly by arrangements for weighing the materials prior to their being fed into the machine. Such expedients proved ineffective and failed to solve the problem for several reasons, including the fact that the volume and weight of material required for filling a mold vary according to the consistency and other characteristics of the material; in actual practice, these variants are so considerable that prior measurements do not provide practical solutions to the problem. These deficiencies of efforts in the prior art are overcome by the present invention in the provision of a device for automatically controlling the feeding of the material responsive to the true operating condition in the machine as sensed by pressures set up within the machine. Pursuant to the present invention, the passage of only sufficient material into the mold required to form the articles is assured during each feeding cycle of operation of the machine, and means are provided for automatically controlling the quantity of material fed through the machine so that excess material will not be fed into the molds but will be combined with subsequent feeding batches which are automatically reduced correspondingly.

Pursuant to the invention, automatic means are provided for regulating and controlling the feeding of material during each cycle so as to precisely fill the molds and to automatically compensate for any residual material in the machine in the excess of that required for given cycles.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a fragmentary, longitudinal, sectional view of a molding machine provided with the device of the invention, Fig. 2 is a fragmentary, sectional view of parts thereof embodying the invention in their position of automatically compensating for excess material and for the retention of such material outside of the molds, Fig. 3a is a fragmentary, schematic view showing a means for sensing the position of parts of the feed control device embodying the invention, Fig. 3b is a schematic, fragmentary view of other parts of the feed control device responsive to the sensing means, Fig. 4 is a fragmentary, partially schematic view of a feed control device embodying the invention, and Fig. 5 is a fragmentary, sectional view of a further form of sensing device which may be used in carrying out the invention.

The invention provides means for automatic control of material fed through an opening as shown at 10 (Figs. 1 and 2) to the article forming molds, one of which might be secured as at 11 and 12 to a part 13 of the plastic molding machine 14. The material is fed through a heating cylinder 15 and thence in repeated feeding cycles, through the bore 16 of a nozzle 17 and into the mold opening 10 under pressure to form the articles in the mold; the pressure is relieved after the articles are so formed. The heating cylinder 15 is usually provided with a spreader 18 and with suitable heating means such as heat bands 19. The adapter 20 connecting the cylinder 15 and nozzle 17 may be provided with similar heating bands 21, and the nozzle may have such bands shown at 22. Such bands may be controlled by thermocouple or other suitable heat controls. As shown at Fig. 4, the material for forming the articles in the mold may be initially fed through a hopper 23 opening onto a tray 24, a plate 25 being hinged to the forward end of the hopper at the bottom thereof in an arrangement such as will permit the plate to move forwardly (in the direction of the arrow F) but not rearwardly. When the tray 24 is moved forwardly in the direction of the arrow F, the material at the bottom thereof will lift the plate 25; said plate will scrape the material for discharge into passageway 27 on the return movement of the tray 24, discharging the material through passageway 27 into the longitudinal bore 28 of the machine 14 (Fig. 1) in which the plunger 29 is reciprocably disposed. The material is then projected, by plunger 29, through the heating cylinder 15, where the material passes through the restrictive passage 30 defined by the heating cylinder and spreader 18, through the adapter 20 and bore 16 of the nozzle 17 and thence through the opening 10 of the article forming molds. The material initially may be in the form of small, relatively solid particles, which, on passage through the machine as above described, change from the relatively solid state to the ultimate plastic state. The plunger 29 is advanced toward the heating cylinder 15 to complete the feeding cycle of the machine and is then retracted away therefrom. The molds are then opened, the completed articles removed, and the cycle repeated.

It will be appreciated, from the foregoing, that if excess material is fed through the nozzle bore 16 on the forward stroke of plunger 29, such material will represent so much waste, will crowd the molds excessively and, on completion of the stroke of the plunger 29, will form "flash" or "fins."

Pursuant to the invention, a feed control device is provided comprising (Figs. 1 and 2), a chamber 31 connected to the nozzle 17, as, for example, by forming the same unitarily therewith or as a separate part fixed thereto. Said chamber 31 is provided with a bore 32 opening tangentially or otherwise into the bore 16 of the nozzle 17. A plunger 33 is positioned in the chamber, adapted to be reciprocated in the bore so as to selectively close or open the chamber bore relative to the nozzle bore. Means are provided normally holding the chamber plunger in the chamber bore so as to close said chamber bore under pressure relative to the nozzle bore. Said pressure means, for example, may be spring means, air pressure, hydraulic or other means shown schematically as a member 54 in Fig. 1, with which plunger 33 is connected, normally urging the plunger toward the bore 16 of the nozzle 17 (arrow D, Fig. 1). Thus the nozzle chamber bore is normally closed under pressure relative to the nozzle bore, so that, on movement of the plunger 29 toward heating cylinder 15 the material will be fed through the bore 16 of the nozzle 17 and the aperture 10 of the article forming molds. Assuming, now, a situation in which an excess of such material is so fed to the bore 16 of the nozzle 17 by the plunger 29. The means 54 urges chamber plunger 33 in the direction of the arrow D to close the bore 32 of the chamber 31 under a pressure greater than that which is exerted by the plunger 29 for feeding the material in the nozzle bore 16. Thus, while the molds are being filled through the opening 10, the plunger 33 is held in its completely closing position in the bore 32, but when the molds have been filled, the pressure in the bore 16 thereby exerted against the plunger 33 will cause said plunger to retract in the chamber 31 (arrow R, Fig. 2), opening bore 32 of chamber 33 to receive the excess material. Suitable relief valves or other by-passing means (not shown) may be incorporated in unit 54 so as to allow the plunger 33 to retract on being subjected to the greater force exerted in the nozzle bore by plunger 29.

On movement of the plunger 29 in the direction (indicated by arrow 34, Fig. 1) away from the heating cylinder 15 on completion of the article forming cycle, the pressure set up in the bore 16 by plunger 29 is relieved and the material which had previously entered the bore 32 of chamber 31 is then returned to bore 16 of nozzle 17 (and probably thence to passageway 30) the plunger 33 moving downwardly in the chamber 31.

The next batch of material fed through the passageway 27 into the bore 28 of machine 14 is projected by the plunger 29 in its next pressure feeding stroke (direction opposite that of arrow 34 of Fig. 1) through the heating cylinder passageway 30 and through the nozzle passageway 16; the excess material remaining from the prior cycle as above mentioned, will merge with the new batch and pass through the opening 10 into the molds; then the plunger 33 will repeat its above mentioned action, retracting sufficiently to permit any new excess material to flow first into the bore 32 in the chamber 31 and thence, on retraction of plunger 33 on movement of the plunger 29 way from the heating chamber 15, as shown by the arrow 34 in Fig. 1, flowing into the bore 16.

From the above, it will be apparent that excess material fed through the machine will be permitted first to flow into the bore 32 of the chamber 31 and will then be moved out of said chamber and into the bore 16 of the nozzle 17 in advance of feeding of the successive batches of material, with which it will then mingle. Accordingly, the plunger 33 will be cumulatively obliged to retract further into the chamber 21 as a result of successive remainders of excess material. Pursuant to the invention, means are provided responsive to retraction of the plunger to a certain degree or past a certain point or points (which may be reached after one or only several cycles of feeding excess material into the machine). Means are provided responsive to the sensing means and actuated thereby for regulating the feeding of material into the machine so that the next batch or batches will be correspondingly reduced so as to feed into the machine only the required difference to make up a batch required for filling the molds; the new material mingles with the excess material of the prior batches, thereby avoiding wastage of material and feeding precisely the required amount to the molds.

The feed control means may be any means suited to that end. A convenient form comprises (Figs. 3 and 4) a spacer 35 to be interposed automatically when required by operating conditions between parts such as 36, 37 normally setting the volume of material to be admitted into the machine feeding passageway 27. The spacer 35 is actuated responsive to the sensing means (as 38, Fig. 1) in an arangement such that said spacer 35 will be interposed between said parts 36 and 37, to thereby admit a smaller quantity of material only when the presence of excess material of a prior batch is sensed (Fig. 2). Space 35 illustrates one of numerous practical embodiments of the invention, which will become apparent from the disclosure herein.

Any other means may be interposed in the machine pursuant to the invention, which will restrict the volume of material admitted to the passageway 27 upon actuation by sensing means 38. For example, member 35 might be interposed, responsive to the sensing means, in the hopper 23 or passageway 27 either to divert material therefrom or to otherwise restrict the volume of material introduced therethrough.

In the form shown in Fig. 4 (by way of example) tray 24 is provided with adjusting means 39, 40 so that the part 37 may be positioned relative to the part 36 at the point desired to adjust the quantity of material passing through the passageway 27. Such adjustment is found in practice, inadequate for reasons above set forth. The tray 24 is actuated forwardly in the direction of the arrow F upon movement of the plunger 29 toward the heating cylinder 18. Spacer 35 may be normally interposed between the parts 36 and 37 to allow the tray 24 to move forwardly to a lesser degree defined by the width of the interposed spacer 35 and to therefore meter more material than if the spacer 35 were clear of parts 36, 37. The means for normally interposing the spacer 35 between parts 36, 37 or, when required, in the passageway 27 or hopper 23, may comprise solenoids, relays or other switch means of any suitable form, as for example, that shown in Figs. 3, 4 and 5 of the drawing, wherein the spacer 35 is shown secured to a bar 42 pivoted as at 43 on a fixed part 36 of the machine. When actuated, the switch means 40 will move the bar 42 to a position in which the spacer 35 fixed to said bar is interposed between the parts 36, 37; the other switch means 41 will move the bar 42 in the opposite direction to move the spacer 35 clear of the parts 36, 37. The switch means such as solenoids, may be actuated by microswitch or other means 44, 45 which may be connected to the solenoids 40 and 41 by suitable cables 46, 47.

To the foregoing end, plunger 33 of chamber 31 may have a collar 48 secured thereto for actuation of the microswitches 44, 45 selectively, dependent upon the position of the plunger in the chamber 31. Thus, when the plunger is in its lowermost position, closing the bore 32 of said chamber, the micro switch 44 will actuate the solenoid 40 to move the spacer 35 between the parts 36, 37 (Fig. 3b). When the plunger moves to its upper position (Fig. 2) it opens bore 32 of chamber 31; micro switch 45 will then actuate solenoid 41 to rotate bar 42 to move spacer 35 clear of parts 36, 37, so that more material will then be metered into the machine. If desired, the collar 48 may be provided with a finger 49 (Fig. 5) for selective actuation of a number of micro or other switches or the like 50, 51 and 52 which might, for example, be connected with spacers 35 of progressively greater widths, to thus separate, to progressively greater extents, the parts 36, 27, progressively regulating the amount of the material fed into the machine at the next feeding cycle. Chamber 31 may be provided with suitable heating bands controlled by thermocouple or other means.

As above noted, the invention is directed to plastic molding machines wherein the raw material (usually powder granules) is fed into the machine as at a suitable point such as passageway 27, a ram-driven plunger 29 moving the material through a constricted passageway 30 of a heated cylinder 15 and thence through a nozzle 17 and into the mold opening 10. While suitable controls are usually provided for the cylinder and nozzle, the variables affecting the molding material from the point of entry thereof into the machine to the point 10 of discharge into the molds are considerable: There are variables in density of granules of the raw material itself, so that a given force exerted on a given volume of granules will not produce a mass of equal volume to that obtained by exerting the same force on another, equal, volume of such granules. It is found, in practice that, no matter how accurate the heat controls, the rate of heat transfer through powder granules varies substantially. The state of the plastic material is changed from a powder solid, usually, at the time it is introduced into the machine, to a liquid form when passing through the mold aperture 10. The change is not abrupt and complete; there are intermediate sort of hybrid forms in which the material is neither a true solid nor a true liquid, but rather partakes of both. The material is probably in intermediate forms for much of the time it passes through the heating cylinder 15, being more of a sluggish mass than a smooth flowing material at points of its passage through the passageway 30 of heating chamber 15. These variations in consistency and nature of the plastic material introduce further variables.

The density of the final liquid form of the material forced through the opening 10 of the molds, being the product of such variables, is normally not uniform or predictable. The present invention eliminates these variations in density of the material at the point 10 of entry thereof into the mold, by enabling the machine to be set so that the plunger 29 will be driven home with full force on every material feeding stroke of the machine, with ample pressure exerted on the material to feed it, in uniform density, through mold opening 10. The surplus pressure values remaining after the molds are completely filled will not be wasted on further force exerted against the already filled molds (that would usually result in "flash" or "fins") but will be diverted into a force exerted against the plunger 33 which will thereby be retracted within chamber 31 as above noted. Thus the invention results in uniform filling of the molds under uniform density, a very important objective.

The invention also permits accurate and sensitive control to be exerted on the plastic material at the nozzle end of the machine, responsive to sensed actual operating conditions existing there in each feeding operation of the machine, while the ram pressure of plunger 29 (which is of comparatively greater order and is more difficult to control) may be set at a constant value to "drive home" the plunger 29 at each operative stroke thereof.

The invention attains the further important objective of providing means for metering only as much of the plastic material into the molds as is required to precisely fill the molds. Any excess beyond that amount is kept out of the molds and saved for use in subsequent feeding cycles, which are correspondingly reduced. These ends are attained, pursuant to this invention, automatically and without reliance on the human element; indeed, the operation which senses the amount of material required to precisely fill the molds, and in metering just that amount and no more into the molds, is automatic and efficient to a maximum degree. Pursuant to the present invention, important savings in material are thus effected for, in production, the feeding of even slight amounts of excess material into the molds in each feeding cycle of the machine, multiplied by the number of cycles representing a day's production, represents so much waste, which considerably increases the cost of production.

Having thus described my invention, what I claim as new and desire to secure by Letters Patent is:

1. In a plastic molding machine operating in repeated pressure cycles, said machine having article forming molds and having a nozzle opening into said molds and having a material receiving bore opening into the nozzle and having means for filling said bore with a batch of material for filling the molds and for projecting the said batch under pressure through the nozzle and into the molds to fill the latter and for then relieving said pressure and for filling the bore with a new batch of material for the molds, thus completing a pressure cycle of the machine, and having means for successive automatic repetition of said pressure cycle, a device for relieving pressures due to the presence of any excess material in the machine bore beyond that required to fill the molds, said device comprising a chamber having an end opening into the nozzle, a bore in said chamber in line with said end opening thereof, and means in said chamber movable in said bore for closing said chamber end opening under a pressure greater than that normally exerted against the batch of material so projected through the nozzle, but of less pressure than the excess pressure set up when material beyond that required to fill the molds is so moved against said nozzle opening, so that, when a condition of such excess material is present, the chamber end opening will be open to receive said excess material in the chamber, and, when the said pressure for projecting the batch through the nozzle and into the molds is so relieved, the said excess pressure will be relieved and said material will then move out of the chamber and into the bore of the machine, for mingling with the next batch of material, for the next of such pressure cycles.

2. In a device as set forth in claim 1, said means for filling the machine bore with a batch of material for filling the molds being adjustable, said means in said chamber for closing the chamber end opening being axially slidable in said chamber in one direction to so open the end opening of the chamber to receive said excess material and in a reverse direction to so close the end opening of the chamber, and means actuated by said axial movement of the said slidable means in said chamber operable on said adjustable means, to make allowance for the excess material in so filling the machine bore.

3. In a device as set forth in claim 2, said adjustable means for filling the machine bore including a member movable to one position for reducing the material with which the bore is so filled and the said means connecting the said slidable means in said chamber and the said adjustable means being connected to the said movable member to move the latter to said one position so as to adjust said adjustable means to allow for the said excess material, in so correspondingly reducing the material with which the bore is so filled.

References Cited in the file of this patent
UNITED STATES PATENTS

| | | |
|---|---|---|
| 2,263,183 | Martin | Nov. 18, 1941 |
| 2,282,308 | Dahlin | May 12, 1942 |
| 2,465,889 | Lester et al. | Mar. 29, 1949 |